(No Model.) 3 Sheets—Sheet 1.
W. O. LINCOLN.
CONVERTIBLE MILLING AND SLOTTING MACHINE.
No. 293,892. Patented Feb. 19, 1884.
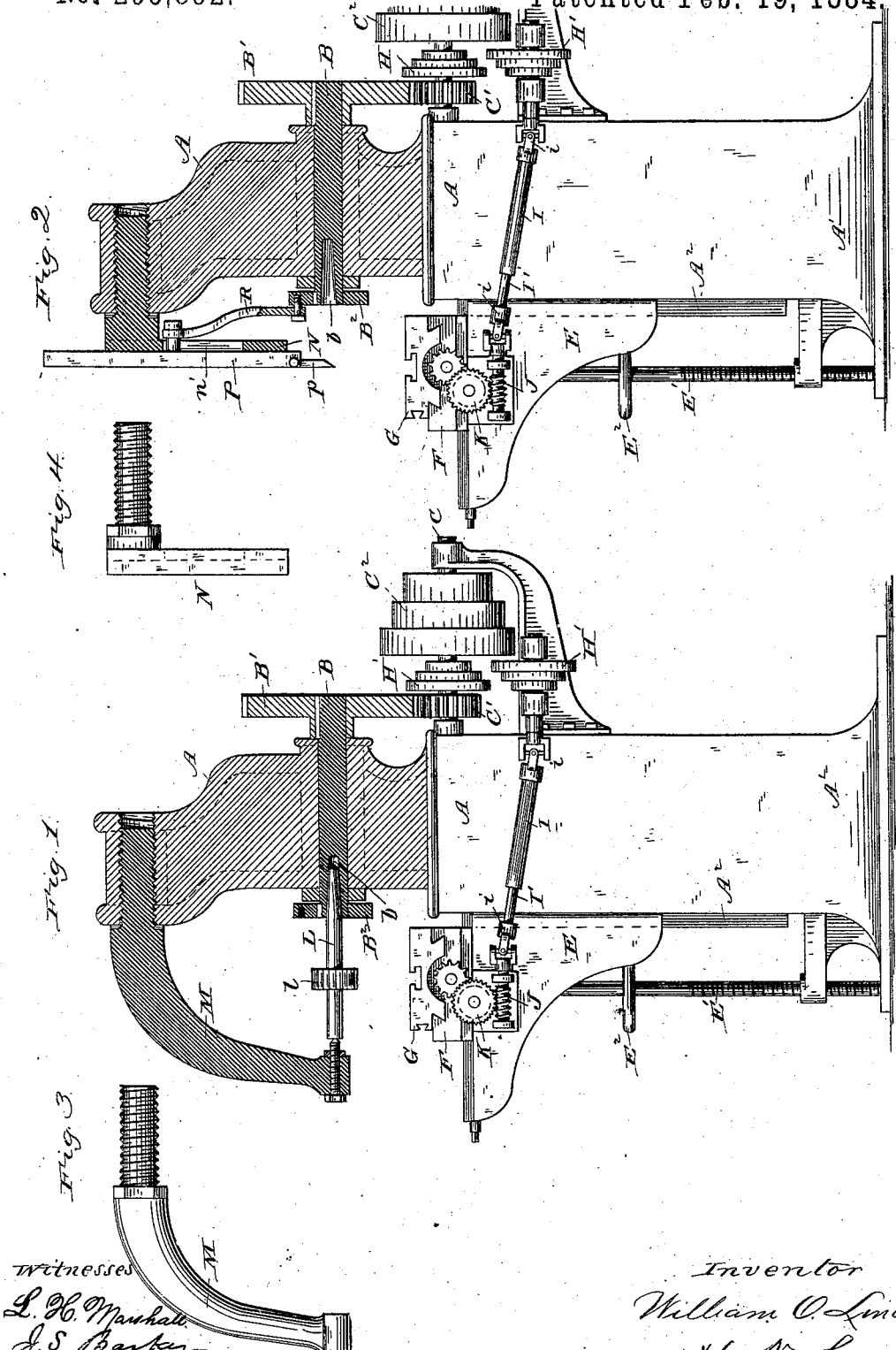

(No Model.) 3 Sheets—Sheet 2.
W. O. LINCOLN.
CONVERTIBLE MILLING AND SLOTTING MACHINE.
No. 293,892. Patented Feb. 19, 1884.
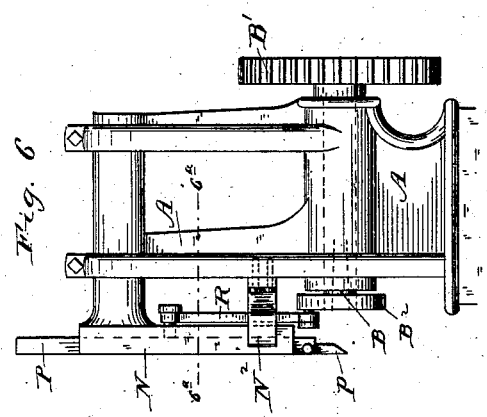
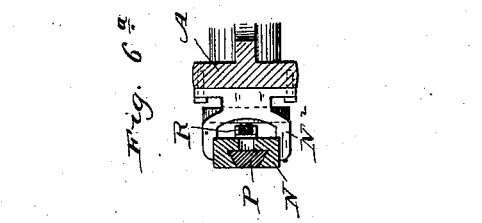
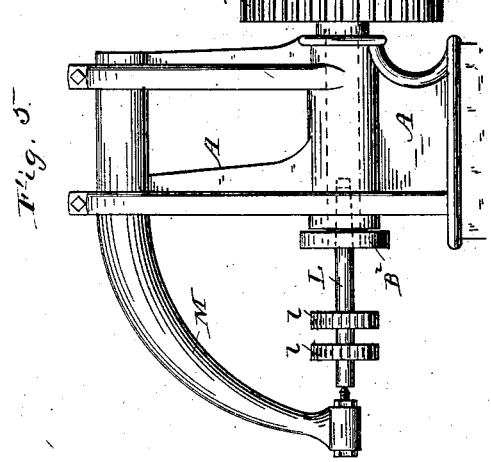
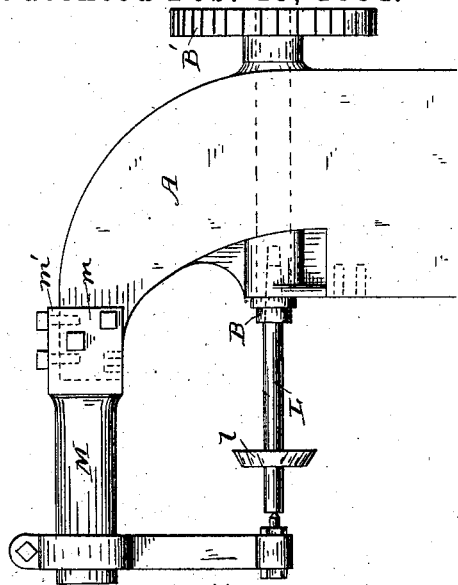
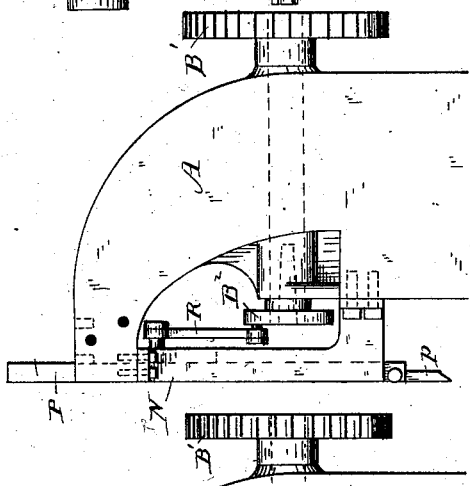
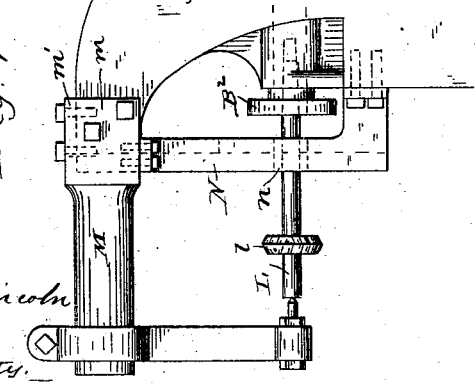
Witnesses:
L. H. Marshall
J. S. Barker
Inventor:
William O. Lincoln
by H. N. Low atty.

(No Model.) 3 Sheets—Sheet 3.
W. O. LINCOLN.
CONVERTIBLE MILLING AND SLOTTING MACHINE.
No. 293,892. Patented Feb. 19, 1884.
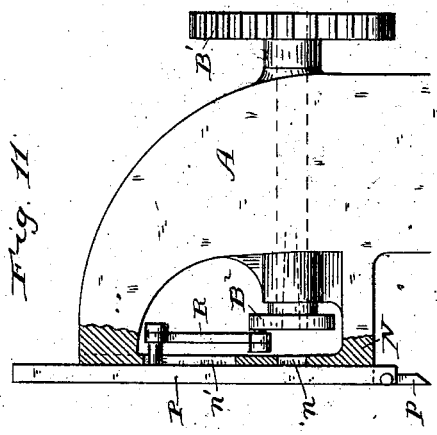
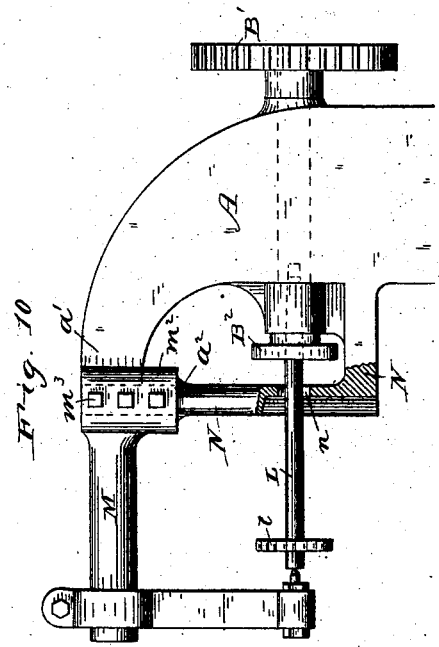
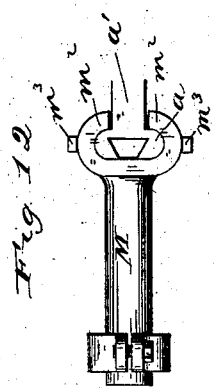
Witnesses:
L. H. Marshall.
J. S. Barker.
Inventor
William O. Lincoln
by H. A. Low
atty.

UNITED STATES PATENT OFFICE.

WILLIAM O. LINCOLN, OF FAIRHAVEN, MASSACHUSETTS.

CONVERTIBLE MILLING AND SLOTTING MACHINE.

SPECIFICATION forming part of Letters Patent No. 293,892, dated February 19, 1884.

Application filed July 13, 1883. (No model.)

*To all whom it may concern:*

Be it known that I, WILLIAM O. LINCOLN, a citizen of the United States, residing at Fairhaven, in the county of Bristol and State of Massachusetts, have invented certain new and useful Improvements in Interchangeable Milling and Slotting Machines, of which the following is a specification, reference being had therein to the accompanying drawings.

The object of my invention is to produce a machine capable of being used interchangeably for milling or slotting, certain simple and easily-performed changes in a few of its parts being sufficient to convert it from a complete milling-machine into a complete slotting-machine, or vice versa. By far the greater part of these two machines is common to both, and one set only of such parts need be used, the conversion of one machine into the other being effected by the change of the few parts which are not common. In some of the constructions in which I have carried my invention into effect both the tools and the tool-holding devices must be changed; but in other forms of my machine hardly any parts except the milling and slotting tools need be changed. In the two machines which I have thus combined the main supporting-frame, adjustable work-table with its feed devices, power and speed regulating pulleys, spindle, and a part of the tool-supporting devices are common to both. These machines are each very expensive; but by the method of combining them which I have devised by far the greater part of the one machine is utilized in the construction of the other, and a proportionate saving in the cost effected, besides economy of floor-room, while the efficiency of the machine, either as a milling-machine or as a slotter, is not in the slightest degree impaired.

In the drawings, which illustrate the preferred forms for carrying my invention into effect, Figure 1 is a partial vertical longitudinal section of a machine arranged for milling, showing one form of my invention. Fig. 2 is a similar view of the same form of machine arranged for slotting. Fig. 3 is a view of the milling-arbor support detached. Fig. 4 is a view of the slotter-guide detached. Fig. 5 is a side view of a machine arranged for milling, showing another mode of attaching the arbor-support and slotter-guide, only such portion of the machine being shown as is necessary to illustrate my invention. Fig. 6 is a similar view of the machine arranged for slotting. Fig. $6^a$ is a horizontal section on line $6^a$, Fig. 6. Fig. 7 is a side view of a portion of a machine arranged for milling, the slotter-slide and pitman being removed, showing another method of attaching the arbor-support and slotter-guide. Fig. 8 is a similar view of the machine arranged for slotting, the milling-arbor and its supporting-arm being removed. Fig. 9 is a view of the machine shown in Fig. 7, the slotter-guide being removed. Fig. 10 is a side view of a portion of a machine arranged for milling, the slotter-slide and pitman being removed, showing another form of attaching the arbor-support and slotter-guide, the latter being made integral with the frame. Fig. 11 is a similar view of the machine arranged for slotting, the arbor and its supporting-arm being removed. Fig. 12 is a detached top plan view of the arbor-support shown in Fig. 10.

A is the supporting-frame, having a base, A', ways $A^2$, for the vertical adjustment of the work-table, and suitable bearings in the upper portion for the journals of the spindle B. The back gearing-shaft, if that be used, is also supported in the upper portion of this frame A, directly below or at one side of the spindle B, as may be preferred. I have not shown this construction in the drawings, but it will be readily understood that one set of back gearing and pulleys may be utilized for both milling and slotting in my combined machine. The spindle B is rotated in any preferred manner, a common method being shown in which two gear-wheels, B' and C', connect the spindle with a power-shaft, C, which latter carries a cone-pulley, $C^2$, through which power may be imparted, and the speed of the machine regulated by belting to the larger or smaller part of the cone, as desired.

The back gearing heretofore mentioned, applied in the ordinary manner, is a convenient means for varying the speed of the spindle; but cone-pulleys may be used, as shown, or other preferred devices.

The work-table may be of any convenient construction having the necessary adjustments for milling. In the form shown, E is a supporting-knee, vertically adjustable upon the ways A² by means of a vertical screw, E', operated in a well-known manner automatically or from a hand-wheel, E². The knee E supports a slide, F, which may be operated by an automatic feed in lines parallel with the spindle, and the slide F in turn supports the work-table G, adapted to be reciprocated by the feed mechanism in lines at right angles to the axis of the spindle. Upon this table G may be mounted the universal head, by means of which angular adjustments of the work can be effected, the spiral cutter, and vise; but these work-holding devices are used in connection with my machine in the ordinary manner, and need not be further described. A feed-motion is imparted to the work-table in a well-known manner by means of pulleys H H', extensible shaft I I', worm J, and worm-wheel K, which latter communicates with a rack and pinion and screw suitably arranged to operate the parts E F G. The shaft I I' is connected to pulley H and to worm J by universal joints $i$, which admit of the vertical and lateral adjustments of the table. Its longitudinal adjustment is permitted by the sliding of the parts I I' upon one another.

It will be understood that a work-table having a revolving feed-motion such as is frequently used with the ordinary forms of slotting-machine may, if desired, be used with my improved machine. The spindle B is provided at its front end, in the usual manner, with an aperture, $b$, constructed to receive the end of the milling-arbor L and impart a rotary motion thereto. The outer end of the arbor is supported by an arm, M, having, preferably, an adjustable center for the arbor, and extending thence to the frame A, so as not to interfere with the rotation of the milling-cutters or the adjustment of the work. This arm M may be attached to the frame in various ways. It may be screwed into the frame, as shown in Fig. 1, inserted in an aperture in the frame A, and clamped therein by a bolt or bolts, which contract the sides of the aperture around the arm, as shown in Fig. 5; or it may be bolted to the frame, as shown in Figs. 7 and 10, an essential feature of its manner of attachment being that it shall be readily secured and detached.

In the construction shown in Fig. 7 the arm is made with a box-like recess formed by side flanges or webs, $m\ m$, which fit the frame A, and a flange or web, $m'$, fitting the top surface of said frame. Bolts are passed through these webs into the frame A, to hold the arm M in place.

In Fig. 10 the upper portion of frame A is expanded horizontally, as shown at $a$, said expanded portion being formed, preferably, by the slotter-guide N. In such case the arm M, at its rear end, passes horizontally around the expansion $a$, and obtains a firm hold thereon by means of lips $m^2$, bolts or set-screws $m^3$ being used to insure greater firmness of attachment.

As will be seen from an inspection of Fig. 12, the arm M in being attached must be passed down over the expansion $a$, the narrow portion $a'$ of the frame A passing between lips $m^2$. When the arm M has reached the proper point, further downward movement may be prevented by the shoulder $a^2$ on the frame or slotter-guide. The rotary milling-cutters $l$ are carried by the arbor L in the usual or any preferred manner.

The changes in the machine necessary to adapt it to slotting will now be described.

Referring to Figs. 2, 6, 8, and 11, N is the slotter-guide, arranged in a vertical position relative to the work-table, and constructed to hold the slide P, which carries the slotting-tool $p$, allowing at the same time of its reciprocation toward and from the work. The slotter-guide may be constructed to take the place of the arbor-support in being attached to the frame as shown in Figs. 2 and 6. It may be made integral with the frame A, as shown in Figs. 10 and 11; or it may be so attached that it may be removed or not, at pleasure, when the machine is arranged for milling. In the last two cases it must be so constructed as to admit of the passage of the milling-arbor, having preferably an aperture, $n$, for the purpose. In many cases the slotter-guide will not interfere with the use of the machine for milling, and it may be used in the form shown in Figs. 7 and 10; but with large work said guide may be in the way and its removal desirable, which can be effected by the construction shown in Figs. 7, 8, and 9. In those structures in which the slotter-guide may remain upon the machine while it is used for milling, Figs. 7 and 10, it may be desirable not to have the lower end of said guide extend below the arbor. If preferred, the guide may be shortened and its lower end connected with the main frame above instead of below the arbor.

When the slotter-guide takes the place of the arm M in being attached to the frame A, it may be found desirable to provide it with an additional connection with said frame at a point nearer the spindle than the point of attachment of the arm M. This may be effected, as shown in Fig. 6, by a brace, N², in which case said brace must be so constructed as not to interfere with the operation of the pitman R. The pitman R is pivoted to the slide P through a slot, $n'$, in the rear wall of the guide N, and is pivoted at its other end to a crank actuated by the spindle. A crank-wheel or disk, B², mounted upon the spindle at or near its forward end, is a convenient means for transmitting the required power. It will be understood without further explanation that when these parts are in position the rotation of the spindle produces a reciprocation of the slotter-slide P, carrying with it the slotting-tool $p$.

To arrange the machine for milling, the pitman R should be detached, slotter-guide removed in such constructions as render it necessary, arm M clamped in place, and arbor inserted into the spindle and centered at the end of arm M. The crank-wheel $B^2$ need not be removed, as the arbor may be inserted through it into the spindle. The reverse of these simple and easily-performed operations will again make the machine ready for slotting.

Any preferred device may be used for converting rotary into reciprocating motion in place of crank-wheel $B^2$, such as an eccentric or cam. Neither do I wish to be limited to the direct connection of the spindle with the arbor L or of the spindle with the crank-wheel $B^2$, as gearing or other power-transmitting devices may be interposed. Moreover, by making a suitable aperture in the rear end of the arbor-support M, or by other equivalent construction to allow of the reciprocation of the slotter-slide, said arbor-support need not be removed to admit of the machine being used for slotting.

I do not wish to be limited to the use of the arm M, as under some circumstances the milling-arbor may be supported entirely by its connection with the spindle.

Having thus described my invention, what I claim, and desire to secure by Letters Patent, is—

1. In the herein-described machine, the combination, with the main supporting-frame, of the spindle provided with devices, substantially as described, whereby it may be connected with and actuate the milling-arbor or the slotter-slide, said frame being also adapted, as set forth, to support either the milling or the slotting tool holding attachments, substantially as described.

2. In the herein-described machine, the combination, with the main supporting-frame, of the spindle provided with devices, substantially as described, whereby it may be connected with and actuate the milling-arbor or the slotter-slide, said frame having an aperture for the reception of the milling-arbor support or the arm of the slotter-guide, substantially as set forth.

In testimony whereof I affix my signature in presence of two witnesses.

WILLIAM O. LINCOLN.

Witnesses:
EDWARD J. LUCE,
FRANK A. MILLIKEN.